United States Patent [19]

Mita et al.

[11] Patent Number: 5,081,672
[45] Date of Patent: Jan. 14, 1992

[54] AUTOMATIC TELEPHONE ANSWERING APPARATUS

[75] Inventors: Satoshi Mita; Akira Matsubara, both of Kanagawa; Hiroshi Nishimura, Saitama; Yoshitomo Nakano, Tokyo, all of Japan

[73] Assignee: Sony Corporation, Tokyo, Japan

[21] Appl. No.: 518,031

[22] Filed: May 2, 1990

[30] Foreign Application Priority Data

May 24, 1989 [JP] Japan .................................. 1-132469
May 31, 1989 [JP] Japan .................................. 1-138177

[51] Int. Cl.[5] .......................... H04M 1/65; H04M 1/64
[52] U.S. Cl. ......................................... 379/68; 379/70; 379/73; 379/76; 379/88
[58] Field of Search ................. 379/70, 76, 68, 74, 379/88, 67, 73

[56] References Cited

U.S. PATENT DOCUMENTS

| | | | |
|---|---|---|---|
| 4,194,089 | 3/1980 | Hashimoto | 379/76 |
| 4,885,764 | 12/1989 | Miwa | 379/70 |
| 4,959,852 | 9/1990 | Kern et al. | 379/88 |
| 4,985,913 | 1/1991 | Shalom et al. | 379/76 |

FOREIGN PATENT DOCUMENTS 0290440  11/1988  Japan ................................ 379/70

*Primary Examiner*—Stuart S. Levy
*Assistant Examiner*—Joseph A. Rhoa
*Attorney, Agent, or Firm*—Philip M. Shaw, Jr.

[57] ABSTRACT

An automatic telephone answering machine which is capable of selecting a new outgoing message or an old outgoing message. If a new OGM is unsatisfactory, the operator may retain an old OGM and discard the new OGM. Both a semiconductor memory and a magnetic tape are utilized in switching the OGM's from one to the other. The OGM stored in the semiconductor memory is automatically checked and read out at least once at an end of storage of the OGM in the semiconductor memory, and thereafter the OGM is automatically read out again and transferred to and recorded in an area of a magnetic tape.

13 Claims, 3 Drawing Sheets

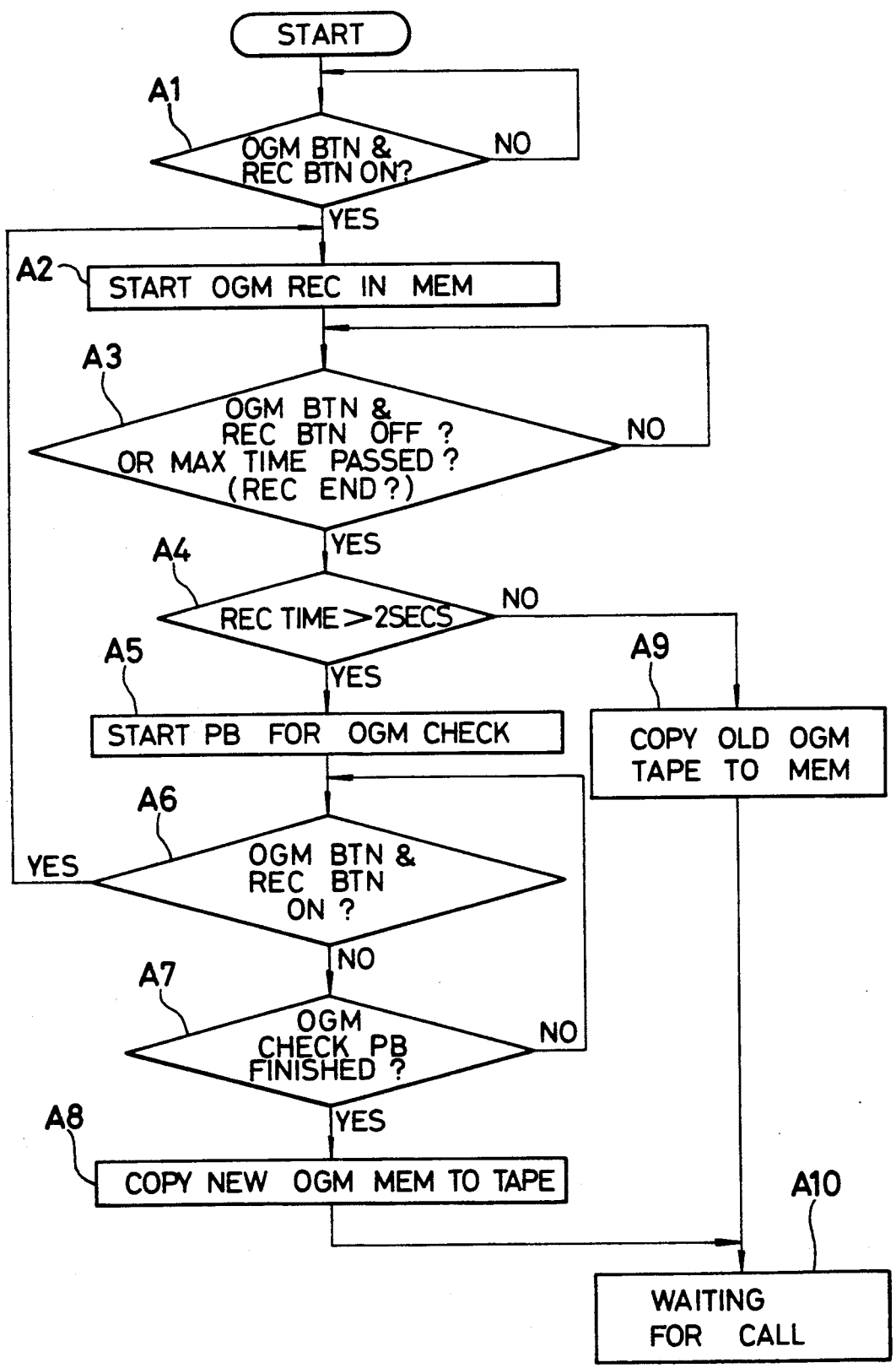

AUTOMATIC TELEPHONE ANSWERING APPARATUS

BACKGROUND OF THE INVENTION

1. Field of the Invention

The present invention relates to an automatic telephone answering apparatus and, more particularly, to an automatic telephone answering apparatus having an outgoing message function and a private message function.

2. Description of the Prior Art

In a so-called automatic telephone answering apparatus which is capable of recording incoming messages while a subscriber is out, when an incoming call is received, an outgoing answering message is first sent instructing the caller to record his or her incoming message, and thereafter, this incoming message is actually recorded. An automatic telephone answering apparatus of this type can have a private message function for allowing a caller (e.g., a mother) to leave a private outgoing message to a specific person (e.g., her child).

In a conventional automatic telephone answering apparatus having outgoing and private message functions, a cassette tape or a memory integrated circuit (IC) is mainly used as the medium for recording the above messages. In order to record an outgoing message or a private message on the recording medium, these messages are recorded on a cassette tape, or only the outgoing message is stored in the memory IC and only the private and incoming messages are recorded on the cassette tape. Alternatively, both the outgoing and incoming messages are stored in the memory IC.

In an automatic telephone answering apparatus for sequentially recording outgoing, private, and incoming messages all on one magnetic tape, the outgoing message is first reproduced and then the incoming message is recorded. For subsequent calls, the tape must be rewound to the beginning to reproduce the outgoing message and then fast forwarded to the end of the last recorded message before the new message can be recorded. This tape forwarding must also be performed to record a private message. In such case the end position of the outgoing message is often spaced apart some considerable distance along the length of the tape from the start position of the incoming message. Thus, when only a cassette tape is used as the medium for recording the various messages, it takes a long tape forwarding/rewinding time which prolongs the time required for recording the messages, confirmation of the recorded contents, and reproduction of the recorded contents.

In other types of message answering devices which store the outgoing message in a memory IC, and record private and incoming messages on the cassette tape, the outgoing message can be immediately reproduced upon reception of the incoming call, and the incoming message can be immediately recorded after reproduction of the outgoing message.

In order to record the incoming message, however, the cassette tape must still be forwarded from the point where the private message is recorded to a position where the incoming message can be recorded. Therefore, high-speed recording and reproduction cannot be performed for the incoming message.

In those message answering apparatus where both the outgoing and incoming messages are recorded in the memory IC, high-speed recording and reproduction of the incoming message can be achieved, thus solving the above problem. In order to perform this, however, the memory capacity must be greatly increased, and the manufacturing cost is consequently increased. In order to minimize an increase in the required memory capacity, the speech conversion (i.e. sampling) rate can be decreased. However, the quality of the voices is degraded, resulting in an inconvenience.

In still another conventional automatic telephone answering apparatus, an outgoing message is stored in a memory IC, the outgoing message is read out from the memory IC upon reception of an incoming call, and an incoming message can be immediately recorded on a cassette tape. An outgoing message recording area is also assigned to the start portion of the cassette tape, and the outgoing message is written in the memory IC. At the same time, the outgoing message is recorded on the magnetic tape to back up the data stored in the memory IC in case of a power failure.

When recording is performed to update the outgoing message, it can often result in failure due to the presence of ambient noise and unsatisfactory sentences in the new message. In this case, the memory IC and the magnetic tape are operated in the write mode and the recording mode, respectively, and another new message is entirely written or recorded to entirely erase the unsatisfactory outgoing message. Sufficient rewrite time is sometimes unavailable to update the outgoing message from a remote location using, e.g., a telephone set elsewhere. When the rewrite time is insufficient, an unsatisfactory outgoing message may be stored in the memory IC and is recorded on the magnetic tape. In this case, the old outgoing message prior to the updating of the message might be better than the updated unsatisfactory outgoing message. However, the old outgoing message written in the memory IC and the magnetic tape was partially or entirely erased upon writing of the new outgoing message. The old outgoing message cannot be recovered.

When the newly written outgoing message is unsatisfactory, it cannot be updated unless another new message is written over the unsatisfactory message.

SUMMARY OF THE INVENTION

It is an object of the present invention to provide, in consideration of the above problems, an automatic telephone answering apparatus capable of immediately recording an outgoing message on a magnetic tape, checking the recorded content, and reproducing the recorded content without increasing the capacity of the apparatus' semiconductor memory and without degrading the quality of the voice in the message which is stored and reproduced.

It is another object of the present invention to provide, in consideration of the above problems, an automatic telephone answering apparatus capable of selecting a new outgoing message or an old outgoing message prior to recording of the new message so as to preserve the selected message on the recording medium.

The above and other objects of the invention are achieved by an automatic telephone answering apparatus of the type which includes a magnetic tape having at least one outgoing message area, at least one private message area, and at least one incoming message area in a longitudinal direction of the magnetic tape, a tape recorder/reproducer for recording and reproducing on and from a magnetic tape an outgoing message, a private message for a specific person, and an incoming message sent from the caller, a semiconductor memory circuit, for writing the outgoing and private messages in a semiconductor memory and reading out the outgoing and private messages from the semiconductor memory, an input and output switching circuit for connecting the apparatus to the telephone lines, and a microprocessor based controller for controlling operations of at least the tape recorder/reproducer, the memory circuit, and the input and output switching circuit. This type of automatic telephone answering apparatus is arranged to read out the outgoing message stored in the semiconductor memory and send the readout outgoing message to the caller, and to record the incoming message sent from the caller on the magnetic tape.

The improvement on this conventional apparatus which is subject of this invention comprises:

outgoing message recording mode means for temporarily storing an input outgoing message in the semiconductor memory, reading out the outgoing message stored in the semiconductor memory upon completion of a write operation of the input outgoing message, and transferring and recording (copying) the readout outgoing message to and in a predetermined outgoing message area of the magnetic tape; and private message recording mode means for temporarily storing an input private message in the semiconductor memory, reading out the private message stored in the semiconductor memory upon completion of the write operation of the input private message, transferring and recording (copying) the readout private message to and in a private message area of the magnetic tape, then erasing the private message recorded in the semiconductor memory, reproducing the outgoing message recorded in the outgoing message area of the magnetic tape, and transferring and storing (copying) the reproduced outgoing message recorded in the outgoing message area of the magnetic tape to and in the semiconductor memory.

In a preferred embodiment of the present invention the improvement comprises:

new outgoing message rerecording mode means for temporarily storing a new outgoing message in the semiconductor memory while erasing an old outgoing message recorded in the semiconductor memory, reading out the new outgoing message recorded in the semiconductor memory upon completion of a write operation of the new outgoing message in the semiconductor memory, and transferring and recording (copying) the readout new outgoing message to and in a predetermined outgoing message area of the magnetic tape; and new outgoing message rerecording cancel mode means for erasing the new outgoing message stored in the semiconductor memory, reproducing the old message recorded in the outgoing message area of the magnetic tape, and transferring and storing (copying) the reproduced old outgoing message to and in the semiconductor memory when a rerecording cancel operation of the outgoing message is performed at least prior to transfer of the new outgoing message to the magnetic tape upon read access of the new outgoing message from the semiconductor memory.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 5 is a flow chart showing the operation followed by the system controller of the apparatus depicted in FIG. 1 in updating of an outgoing message.

DETAILED DESCRIPTION OF THE PREFERRED EMBODIMENT

Figure 1:
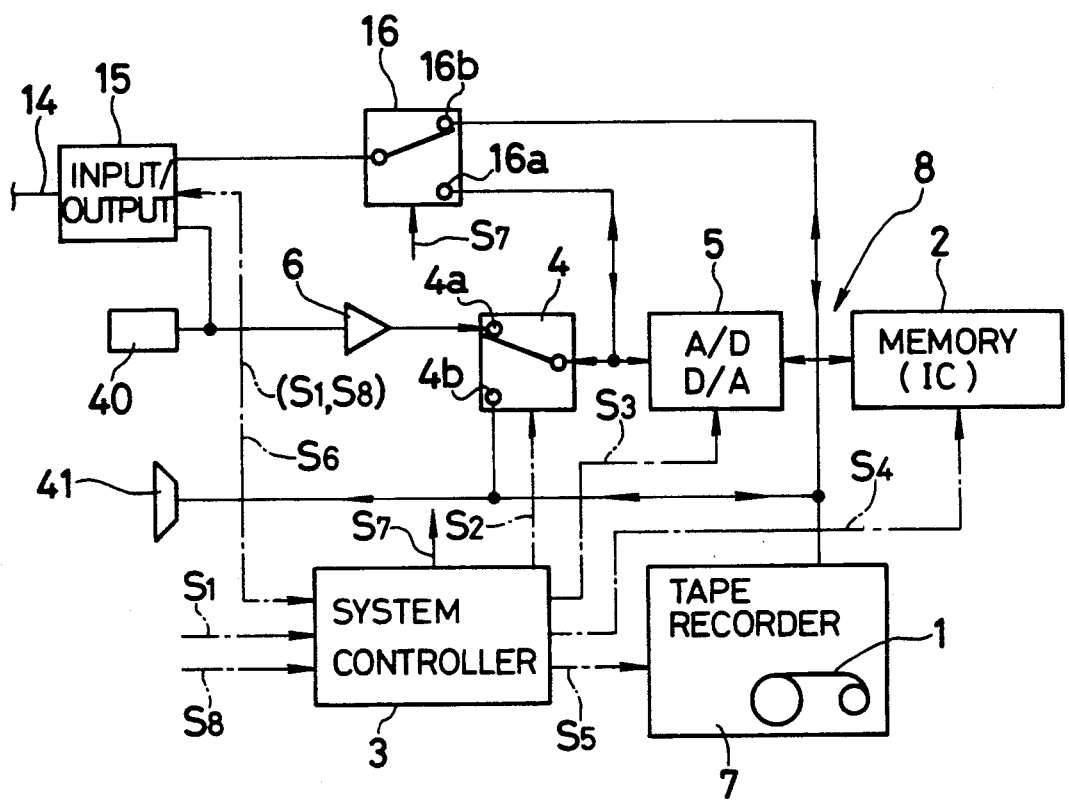
FIG. 1 is a schematic diagram showing a main portion of an automatic telephone answering apparatus according to an embodiment of the present invention.

Referring to FIG. 1, the automatic telephone answering apparatus uses a magnetic tape (cassette tape) 1 and a memory IC 2 as media for recording voices. The recording (write) and reproducing (read) operations of these recording media are controlled by a system controller 3 comprising a programmed microcomputer (not shown).

Figure 3:
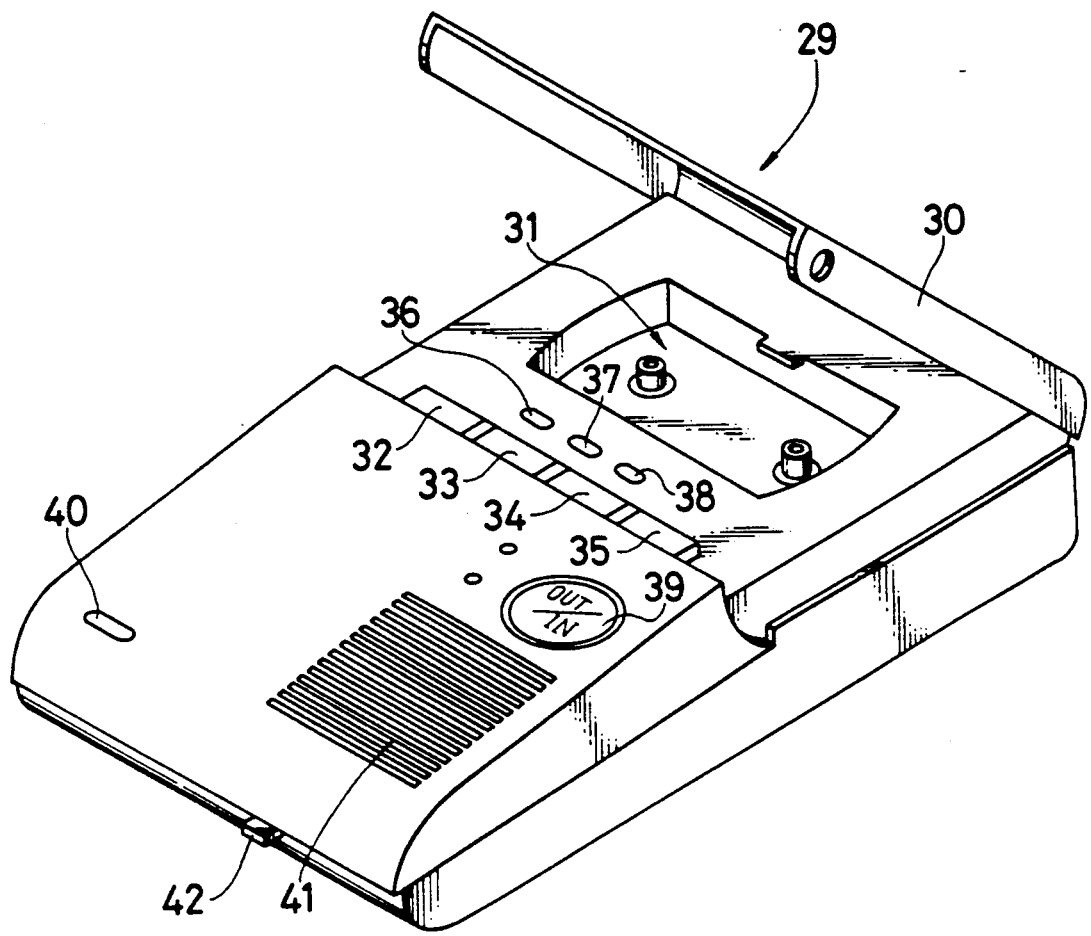
FIG. 3 is a perspective view showing the outer appearance of the apparatus shown in FIG. 1 when ready for loading a cassette tape.

As shown in FIG. 3, an openable cassette cover 30 is mounted on the surface of the apparatus body 29. The apparatus 29 includes a tape cassette recorder/reproducer 7, as shown in FIG. 1. The cover 30 can be opened to expose a cassette loading portion 31, and the cassette tape 1 is loaded in or unloaded from the cassette loading portion 31. A speech recording (REC) button 32, a playback (PB)/fast forward button 33, a stop button 34, a rewind button 35, and the like are arranged to provide input signals to the system controller 3 to select an operating mode of the tape recorder 7 using the cassette tape 1 as a recording medium. A recording button 36, an outgoing message (OGM) button 37, an incoming message button 38, an OUT/IN mode button 39, and the like are arranged for controlling the operation of the automatic telephone answering apparatus by providing signal inputs to the system controller 3.

In order to perform recording of an outgoing message, the recording button 36 and the outgoing message button 37 are simultaneously depressed to input an operation designation signal S1 for designating a recording operation of an outgoing message to the system controller 3. When the system controller 3 receives the operation designation signal S1, it outputs a switching signal S2 to a switch 4 to set the switching contact to a fixed contact 4a, as shown in FIG. 1. The system controller 3 also outputs read/write designation signals S3 and S4 to the signal converter 5 and the memory IC 2, respectively, so that the converter 5 is operated in an A/D conversion mode and the memory IC 2 is operated in a write mode.

The recording operation of an IC memory recorder 8 including the memory IC 2, the signal converter 5, and the system controller 3 is thus started. An outgoing message input from a microphone 40 arranged on the apparatus body 29 is supplied to the signal converter 5 through an amplifier 6 and the fixed contact 4a. The outgoing message is converted into a digital signal by the signal converter 5 and is sequentially written in the memory IC 2.

The outgoing message written in the memory IC 2 is immediately read out upon completion of the write operation. That is, the recording button 36 and the outgoing message button 37 are simultaneously pressed or after a predetermined recording time of the memory IC 2 has elapsed, recording of the outgoing message is completed. When new signals S3 and S4 are output from the system controller 3, the signal converter 5 is switched to the D/A conversion mode and the memory IC 2 is switched to the read mode, respectively. The switching contact of the switch 4 is changed to a fixed contact 4b in response to a new signal S2. The outgoing message written in the memory IC 2 is read out, and the readout message is supplied to the signal converter 5. The digital message signal is converted into an analog signal by the signal converter 5. The analog signal is supplied to a speaker 41 through the fixed contact b, thus confirming the message content. Thereafter, the read mode is set, and the outgoing message is output from the memory IC 2 to the tape recorder 7. The outgoing message is supplied to the fixed contact 16a. The fixed contact 16a is selected by a switching signal S7 output from the system controller 3 in response to an operation control signal S6 from an input/output circuit 15 upon detection of an incoming call from a caller. The outgoing message is sent from the contact 16a onto a telephone line 14 through the input/output circuit 15.

The recording/reproducing operation of the tape recorder 7 is controlled by a control signal S5 supplied from the system controller 3. In the first read mode of the memory IC 2, i.e., during confirmation of the recorded content, the tape recorder 7 is not set in the recording mode. In the read mode of the outgoing message, only monitoring of the content of the memory IC 2 is performed. The volume level of the speaker 41 can be variably controlled by a sliding knob 42.

Figure 2:
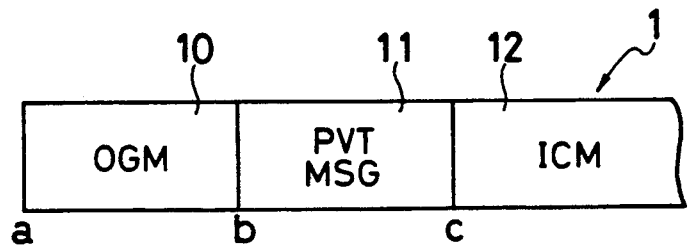
FIG. 2 is a diagrammatic view showing a recording format of a magnetic tape used in the embodiment shown in FIG. 1.

If no correction of the recorded content is to be made upon confirmation of the recorded content, the outgoing message written in the memory IC 2 is read out again (the second read operation) under the control (via signals S2, S3, S4, and S5) of the system controller 3. At the same time, the recording operation of the tape recorder 7 is started. The outgoing message read out from the memory IC 2 is magnetically recorded on an outgoing message area 10, i.e., a point a to a point b on the magnetic tape 1 shown in FIG. 2. Thereafter, the tape is driven to a position where the magnetic head (not shown) in the tape recorder 7 is aligned with the beginning of an incoming message area 12.

The outgoing message is again stored in the memory IC 2 after it is transferred to the outgoing message area 10 of the magnetic tape 1. Every time an incoming call is received by the automatic telephone answering mode, the outgoing message on the magnetic tape is not reproduced, but the same outgoing message is read out from the memory IC 2. The readout outgoing message is reproduced and sent to the caller. In this manner, since the outgoing message is read out from the memory IC 2, the magnetic head (not shown) in the tape recorder 7 can be kept at the position of the incoming message area 12 to be capable of recording an incoming message. This area 12 is located after a point c in FIG. 2. Therefore, the incoming message can be recorded immediately after the outgoing message is reproduced.

An operation for recording a private message will now be described. When the recording button 36 and the private message button 38 are simultaneously depressed, an operation designation signal S8 for performing the private message operation is supplied to the system controller 3. The system controller 3 outputs the control signal S2 to switch the switching contact of the switch 4 to the fixed contact 4a. The system controller 3 also outputs the control signals S3 and S4 to operate the signal converter 5 in the A/D conversion mode and the memory IC 2 in the write mode, respectively. The recorder 8 is set in the recording state in response to a signal S5 from the system controller 3. Private messages input from the microphone 40 are sequentially written in the memory IC 2. In this case, when the outgoing message is already written in the memory IC 2, this outgoing message is, of course, erased. Upon completion of writing of the private message, the system controller 3 outputs the control signals S2, S3, and S4 to allow a subscriber to check the contents of the memory IC 2. When no correction of the write contents is performed, the private message written in the memory IC 2 is read out again, and the readout message is recorded in a private message recording area 11 of the tape 1, i.e., an area from the point b to the point c in FIG. 2, in response to the signal S5.

These operations are the same as those in outgoing message recording. However, in recording of the private message, the following operations are automatically performed. More specifically, when recording of the private message in the private message area 11 on the magnetic tape is completed, the magnetic tape 1 is rewound to the start position a of the outgoing message recording area 10, and the outgoing message recorded on the magnetic tape 1 is forcibly reproduced. This reproduced outgoing message is supplied to the memory IC 2 through the fixed contact 4b and the signal converter 5. The storage content of the memory IC 2 is changed from the private message to the outgoing message recorded on the magnetic tape 1. Therefore, the memory IC 2 serves as a memory for writing a private message, and the outgoing message is temporarily erased from the memory IC 2. Upon completion of recording of the private message, the outgoing message is restored in the memory IC 2.

In the incoming standby mode of the automatic telephone answering mode, the outgoing message on the magnetic tape is certainly stored in the memory IC 2. For this reason, upon reception of an incoming call, the outgoing message can be immediately output from the memory IC 2. In addition, after the outgoing message is read out, the incoming message can be immediately recorded in the incoming message area 12 on the magnetic tape 1. The memory IC 2 can be used to record the private message on the magnetic tape 1 without degrading quick response upon reception of an incoming call and quick operation for writing the private message. After the outgoing message on the magnetic tape 1 is written in the memory IC 2 again, upon completion of recording the private message, the outgoing message can be automatically reproduced to be checked. Thereafter, the automatic telephone is set in the incoming standby mode.

Since the automatic telephone answering apparatus of this embodiment can record outgoing and private messages as described above, quick recording of the outgoing and private messages and quick confirmation of the outgoing and private messages can be achieved. In addition, the memory capacity can be kept unchanged without shortening the recording time or reducing the sampling frequency.

The message stored in the memory IC 2 is written on the magnetic tape 1. Even if a power failure occurs, the memory data can be easily copied from the messages recorded on the magnetic tape 1.

In the above described embodiment, the apparatus 29 is directly operated to record the outgoing and private messages. The apparatus 29, however, can be remotely controlled by the operation designation signals S1 and S8 from the system controller 3 in response to a predetermined ID code supplied from a telephone set to the input/output circuit 15 through the telephone line 14. If a predetermined ID code is input through the telephone line 14 and the input/output circuit 15 to the system controller 3, the tape recorder 7 is caused to operate in the message reproduction mode and the reproduced output is sent onto the telephone line 14 through the fixed contact 16b and the input/output circuit 15. The incoming and private messages recorded on the magnetic tape 1 can be listened to at a telephone set elsewhere. Outgoing and private messages can also be recorded from an external telephone set under remote control. In this case, it is convenient to transfer the outgoing and private messages stored in the memory IC 2 to the magnetic tape 1 after the telephone line is off.

Figure 4:
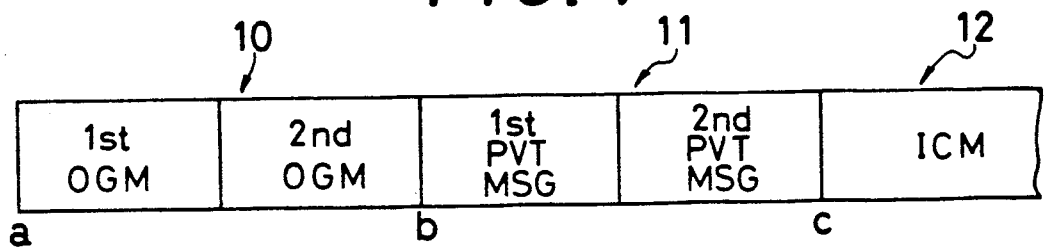
FIG. 4 is a diagrammatic view showing another recording format of a recording tape different from that in FIG. 2.

As shown in the recording format in FIG. 4, a plurality of outgoing messages and a plurality of private messages can be recorded in the message recording areas 10 and 11, respectively. In this case, the capacity of the memory IC 2 can correspond to only one outgoing or private message. In the automatic telephone answering apparatus of this embodiment, the telephone set and the recorders are independent units. However, the recorders can be arranged integrally with the telephone set.

In the automatic telephone answering apparatus having the above arrangement, updating of the content of the outgoing message (OGM) sent to a caller will be described below. The apparatus is operated in the OGM recording mode, a new message is input through the microphone 40 arranged in the apparatus or an external telephone set. The new outgoing message input through the input unit is supplied to the signal converter 5 through the amplifier 6 and the contact 4a in response to the signals S2, S3, and S4 from the system controller 3. The new outgoing message is converted into a digital signal by the signal converter 5. The digital signal is then written in the memory IC 2. When the maximum recording time of the memory IC 2 has elapsed or when the message OGM button 37 and the recording button 36 are no longer activated, or when a command signal for interrupting the write operation is sent through the telephone line 14, then the IC memory recorder 8 is set in the read mode in response to the signals S2, S3, and S4 from the system controller 3. The outgoing message (OGM) newly recorded on the magnetic tape 1 is read out and confirmed. An operator who updates the outgoing message monitors the content of the memory IC 2. If the storage content is unsatisfactory, the outgoing message (OGM) button 37 and the recording button 36 are simultaneously depressed or a command signal for starting writing is input from the external telephone set, thereby writing a satisfactory outgoing message again.

When confirmation of the storage content in the memory IC 2 is completed, the IC memory recorder 8 reads out the new outgoing message from the beginning. At the same time, the tape recorder 7 is operated in the recording mode in response to the signal S5 from the system controller 3. Transfer and recording (copy) of the message from the memory IC 2 to the cassette (magnetic) tape 1 are started. The new outgoing message (OGM) is recorded in the outgoing message recording area 10 on the cassette tape 1.

An operator or subscriber is often not satisfied with the new outgoing message due to the presence of noise or a poor message. In this case, prior to execution of transfer and recording of the message onto the magnetic tape 1, i.e., during a read operation of the message for confirmation, the OGM button 37 and the recording button 36 are simultaneously depressed within 2 seconds, e.g., 1 second later, to erase the new outgoing message stored in the memory IC 2.

When the OGM button 37 and the recording button 36 are simultaneously depressed within 2 seconds during confirmation of the newly written OGM message, or when a predetermined key of an external key telephone set is depressed, an erase command signal is input to the system controller 3. The IC memory recorder 8 is switched to the write mode, and at the same time the tape recorder 7 is switched to the reproduction mode. In this case, the old outgoing message written on the cassette tape 1 is reproduced and is transferred to and written in the memory IC 2. Therefore, the new outgoing message is erased from the memory IC 2, and the old outgoing message prior to updating is restored in the memory IC 2.

FIG. 5 is a flow chart for explaining the operation for updating an outgoing message upon direct operation of the apparatus. Referring to FIG. 5, when the OGM button 37 and the recording button 36 are simultaneously depressed (step A1) a mode for writing the outgoing message (OGM) in the memory IC 2 is set (step A2). In this embodiment, the outgoing message (OGM) can be stored in the memory IC 2 during the period when the OGM button 37 and the recording button 36 are kept depressed. Therefore, the OGM button 37 and the recording button 36 must be kept depressed during writing. When simultaneous depression of the OGM button 37 and the recording button 36 is stopped or the maximum recording time (e.g., 8 seconds) of the memory IC 2 has elapsed, it is checked whether the OGM recording time exceeds a valid write time of, e.g., 2 seconds (step A4). If the OGM recording time is determined to exceed 2 seconds, the storage content of the memory IC 2 is automatically read out for checking (step A5). The readout message is monitored at the speaker 41 or an external telephone set through the telephone line 14. If the message is satisfactory, it is determined that the OGM button 37 and the recording button 36 are not simultaneously depressed (step A6). If the read time exceeds the write time calculated in step A4 and the automatic read operation is completed (step A7), the new outgoing message is transferred to and recorded on the magnetic tape 1, and the recorded outgoing message is preserved. OGM recording and preservation are thus completed.

When the recording content of the new outgoing message (OGM) is not satisfactory, the OGM button 37 and the recording button 36 are simultaneously depressed again during the automatic read operation in step A5. In this case, the simultaneous depression is performed within 2 seconds. That is, for example, when the buttons 37 and 36 are simultaneously kept depressed within one second, one-second writing can be forcibly performed in the memory IC 2. One-second writing is detected in step A4. In this case, the flow advances to step A9, and the old outgoing message (OGM) is reproduced from the magnetic tape 1 and is transferred to and stored in the memory IC 2 again. That is, the old outgoing message (OGM) is restored. When an operator wants to further correct the outgoing message (OGM) the flow starts from step A1 or A6.

In the automatic telephone answering apparatus of this embodiment, at the end of the input of a new outgoing message, the new outgoing message or the old outgoing message can be selected, and the selected message can be reserved for subsequent use. Since the old OGM is not erased even when a new OGM is unsatisfactory, the user can update the outgoing message without any hesitation, thereby greatly improving the convenience of the function of generating an outgoing message.

In the above embodiment, the OGM button 37 and the recording button 36 are simultaneously depressed during message read access for checking, and a new one-second written portion can be recorded within a 2 second window. This written portion is detected as an erase command signal. However, the present invention is not limited to this write interruption method. A transfer cancel button or a transfer cancel code for a telephone line can be enabled during read access for checking the message, thereby inhibiting transfer of the message to or its recording on the cassette tape 1. A manual button for transferring the outgoing message from the memory IC 2 to the cassette tape 1 and recording it on the cassette tape 1 can be arranged independently of a manual button for interrupting transfer of the outgoing message to the cassette tape and restoring it in the memory IC 2. In this case, the respective transfer operations can be manually performed. With this arrangement, after the storage content of the memory IC 2 is read out and confirmed, whether the outgoing message is preserved or not can be selected without any time limit.

Although the present invention has been shown and described with respect to preferred embodiments, various changes and modifications which are obvious to a person skilled in the art to which the invention pertains are deemed to lie within the spirit and scope of the invention.

What is claimed is:

1. An automatic telephone answering apparatus of the type which includes:
   a magnetic tape having at least one outgoing message area, at least one private message area, and at least one incoming message area in a longitudinal direction of the magnetic tape;
   tape recording and reproducing means for recording and reproducing on and from the magnetic tape an outgoing message, a private message for a specific person, and an incoming message sent from the caller;
   memory writing and reading means, including a semiconductor memory, for writing the outgoing and private messages in the semiconductor memory and reading out the outgoing and private messages from the semiconductor memory,
   input and output switching means for connecting the telephone answering apparatus to a set of telephone lines; and
   control means for controlling the operations of at least the tape recording and reproducing means, the memory writing and reading means, and the input and output switching means in accordance with one or more set modes;
   the automatic telephone answering apparatus being arranged to read out the outgoing message stored in the semiconductor memory and send the readout outgoing message to the caller, and to record the incoming message sent from the caller on the magnetic tape, characterized by:
   outgoing message recording mode means for temporarily storing a newly input outgoing message in the semiconductor memory, thereafter reading out the stored outgoing message from the semiconductor memory, and transferring and recording the readout outgoing message to and in a predetermined outgoing message area of the magnetic tape; and
   private message recording mode means for temporarily storing an input private message in the semiconductor memory, reading out the temporarily stored private message from the semiconductor memory, transferring and recording the readout private message to and in a private message area of the magnetic tape, then erasing the private message recorded in the semiconductor memory, reproducing the outgoing message recorded in the outgoing message area of the magnetic tape, and transferring and storing the reproduced outgoing message recorded in the outgoing message are of the magnetic tape to and in the semiconductor memory.

2. An apparatus according to claim 1, wherein the outgoing message stored in the semiconductor memory is automatically checked and read out at least once at an end of storage of the outgoing message in the semiconductor memory, and thereafter the outgoing message stored in the semiconductor memory is automatically read out again and transferred to and recorded in the predetermined outgoing message are of the magnetic tape.

3. An apparatus according to claim 1, wherein the private message stored in the semiconductor memory is automatically checked and read out at least once at an end of storage of the private message in the semiconductor memory, and thereafter the private message stored in the semiconductor memory is automatically read out again and transferred to and recorded in the predetermined private message area of the magnetic tape.

4. An apparatus according to claim 1, wherein an incoming standby state is automatically set at the end of the recording mode of the outgoing message.

5. An apparatus according to claim 1, wherein an incoming standby state is automatically set at the end of the recording mode of the private message.

6. An apparatus according to claim 1, wherein the magnetic tape has a plurality of outgoing message areas, a plurality of private message areas, and a plurality of incoming message areas in a longitudinal direction of the magnetic tape.

7. An automatic telephone answering apparatus of the type including
   tape recording and reproducing means for recording and reproducing on a magnetic tape an outgoing message;
   memory writing and reading means, including a semiconductor memory, for writing the outgoing message in the semiconductor memory and reading out the outgoing message from the semiconductor memory;

input and output switching means for connecting the telephone answering apparatus to a pair of telephone lines; and control means for controlling the operations of at least the tape recording and reproducing means, the memory writing and reading means, and the input and output switching means;

the automatic telephone answering apparatus being arranged to read out the outgoing message stored in the semiconductor memory and send the readout outgoing message to the caller, and to record the incoming message sent from the caller on the magnetic tape, characterized by:

new outgoing message rerecording mode means for temporarily storing a new outgoing message in the semiconductor memory while erasing an old outgoing message recorded in the semiconductor memory, reading out the new outgoing message recorded in the semiconductor memory upon completion of the writing in of the new outgoing message in the semiconductor memory, and transferring and recording the readout new outgoing message to and in a predetermined outgoing message area of the magnetic tape; and new outgoing message rerecording cancel mode means for erasing the new outgoing message stored in the semiconductor memory, reproducing the old message recorded in the outgoing message area of the magnetic tape, and transferring and storing the reproduced old outgoing message to and in the semiconductor memory when a rerecording cancel operation of the outgoing message is performed at least prior to transfer of the new outgoing message to the magnetic tape upon read access of the new outgoing message from the semiconductor memory.

8. An apparatus according to claim 7, further comprising means for reading out and checking the new outgoing message recorded in the semiconductor memory at least once at the end of the rewriting operation of the new outgoing message in the semiconductor memory.

9. An apparatus according to claim 7, wherein an incoming standby state is automatically set at the end of the new outgoing message rerecording mode or the new outgoing message rerecording cancel mode.

10. An apparatus according to claim 7, wherein the rerecording cancel operation comprises forcibly rewriting a predetermined rewriting cancel signal in the semiconductor memory during read access and checking of the new outgoing message stored in the semiconductor memory.

11. An apparatus according to claim 8, wherein the predetermined rewriting cancel signal is forcibly rewritten in the semiconductor memory for a predetermined period of time during read access and checking.

12. An automatic telephone answering method for use with a recording/reproducing apparatus which includes a semiconductor memory and a tape for recording and reproducing messages, the magnetic tape having at least one outgoing message area, at least one private message area, and at least one incoming message area in a longitudinal direction of the magnetic tape, and which method is of the type which includes the steps of:

recording and reproducing on and from the magnetic tape an outgoing message, a private message for a specific person, and an incoming message sent from the caller;

writing the outgoing and private messages in the semiconductor memory and reading out the outgoing and private messages from the semiconductor memory;

controlling at least the tape recording and reproducing steps and the memory writing and reading in accordance with a set mode in order to read out the outgoing message stored in the semiconductor memory and send the readout outgoing message to the caller, and record the incoming message sent from the caller on the magnetic tape; characterized by:

a outgoing message mode which includes the steps of temporarily storing an input outgoing message in the semiconductor memory, reading out the outgoing message stored in the semiconductor memory upon completion of storing the input outgoing message, and transferring and recording the readout outgoing message to and in a predetermined outgoing message area of the magnetic tape; and a private message recording mode which includes the steps of temporarily storing an input private message in the semiconductor memory, reading out the private message stored in the semiconductor memory upon completion of the write operation of the input private message, transferring and recording the readout private message to and in a private message area of the magnetic tape, then erasing the private message recorded in the semiconductor memory, reproducing the outgoing message recorded in the outgoing message area of the magnetic tape, and transferring and storing the reproduced outgoing message recorded in the outgoing message area of the magnetic tape to and in the semiconductor memory.

13. An automatic telephone answering method of the type which includes the steps of:

recording and reproducing on and from a magnetic tape an outgoing message and an incoming message sent from the caller;

writing the outgoing message in a semiconductor memory and reading out the outgoing message from the semiconductor memory, and performing the recording, reproducing and writing steps in accordance with a set mode so as to read out the outgoing message stored in the semiconductor memory and send the readout outgoing message to the caller, and to record the incoming message sent from the caller on the magnetic tape, characterized by the steps of:

temporarily storing a new outgoing message in the semiconductor memory while erasing an old outgoing message recorded in the semiconductor memory;

reading out the new outgoing message recorded in the semiconductor memory upon completion of a write operation of the new outgoing message in the semiconductor memory;

transferring and recording the readout new outgoing message to and in a predetermined outgoing message area of the magnetic tape;

erasing the new outgoing message stored in the semiconductor memory;

reproducing the old message recorded in the outgoing message area of the magnetic tape; and transferring and storing the reproduced old outgoing message to and in the semiconductor memory when a rerecording cancel operation of the outgoing message is performed at least prior to the transfer of the new outgoing message to the magnetic tape upon read access of the new outgoing message from the semiconductor memory.

* * * * *